United States Patent [19]
Grace et al.

[11] Patent Number: 5,981,895
[45] Date of Patent: Nov. 9, 1999

[54] METHOD OF MANUFACTURE OF A BONE SAW BLADE BY WIRE CUTTING ELECTRIC DISCHARGE MACHINING

[75] Inventors: Richard L. Grace, Russellville; Jeff Grace, Dover; Daniel I. Duerr, Russellville, all of Ark.

[73] Assignee: Grace Manufacturing Inc., Russellville, Ark.

[21] Appl. No.: 08/868,249

[22] Filed: Jun. 3, 1997

[51] Int. Cl.[6] .............................. B23H 1/00; B23H 7/02; B23H 9/00
[52] U.S. Cl. ........................................................ 219/69.12
[58] Field of Search ........................... 219/69.12, 69.17; 30/166.3

[56] References Cited

U.S. PATENT DOCUMENTS

| | | |
|---|---|---|
| 4,051,422 | 9/1977 | Lavrentiev et al. ................. 219/69.12 |
| 4,490,600 | 12/1984 | Rae ....................................... 219/69.17 |
| 4,739,143 | 4/1988 | Sakai et al. .......................... 219/69.12 |
| 4,751,361 | 6/1988 | Inoue et al. .......................... 219/69.12 |
| 4,778,973 | 10/1988 | Derighetti et al. ................... 219/69.12 |
| 4,793,220 | 12/1988 | Yamamoto et al. ................. 219/69.17 |
| 5,326,954 | 7/1994 | Lenard et al. ........................ 219/69.17 |
| 5,725,530 | 3/1998 | Popken .................................. 30/166.3 |

*Primary Examiner*—Geoffrey S. Evans
*Attorney, Agent, or Firm*—Charles D. Gunter, Jr.

[57] ABSTRACT

A method is shown for manufacturing a bone saw blades from a metal blanks by using an electric discharge machining process. Plural stacks of metal blanks are formed and loaded into a jig where the stacks are secured in an angular position. The stacks of metal blanks are subjected to an electric discharge machining process whereby teeth are machined into the peripheral edges of the metal blanks. The positions of the stacks are switched and the electric discharge machining process is repeated.

16 Claims, 4 Drawing Sheets

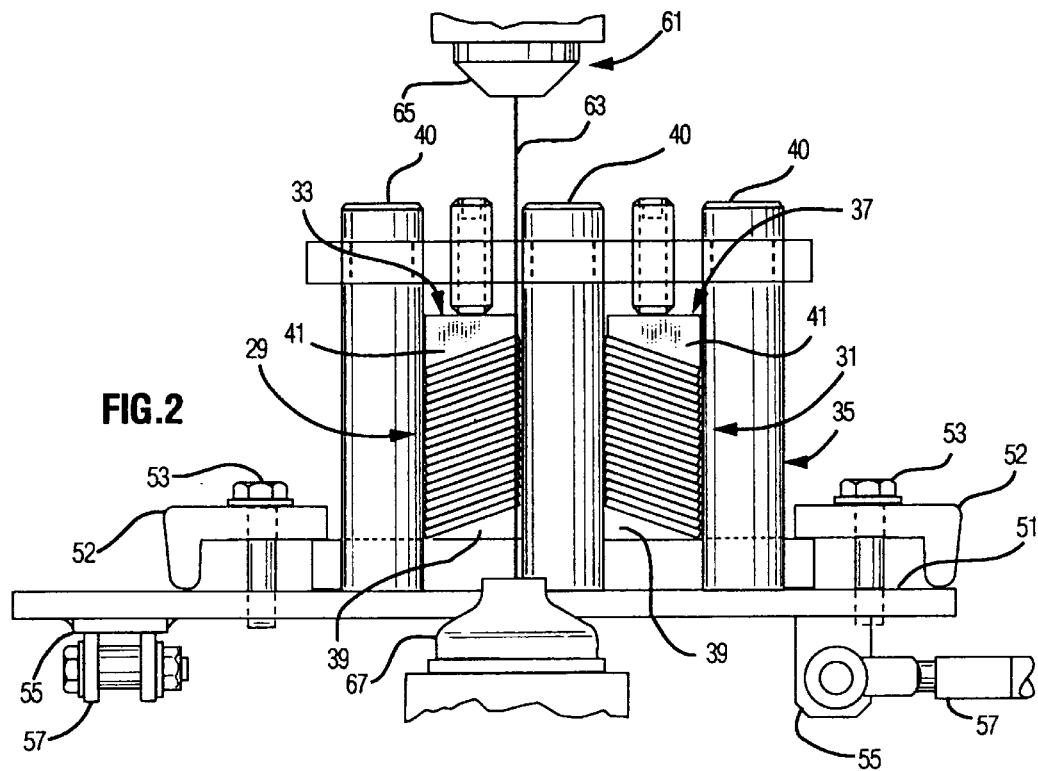
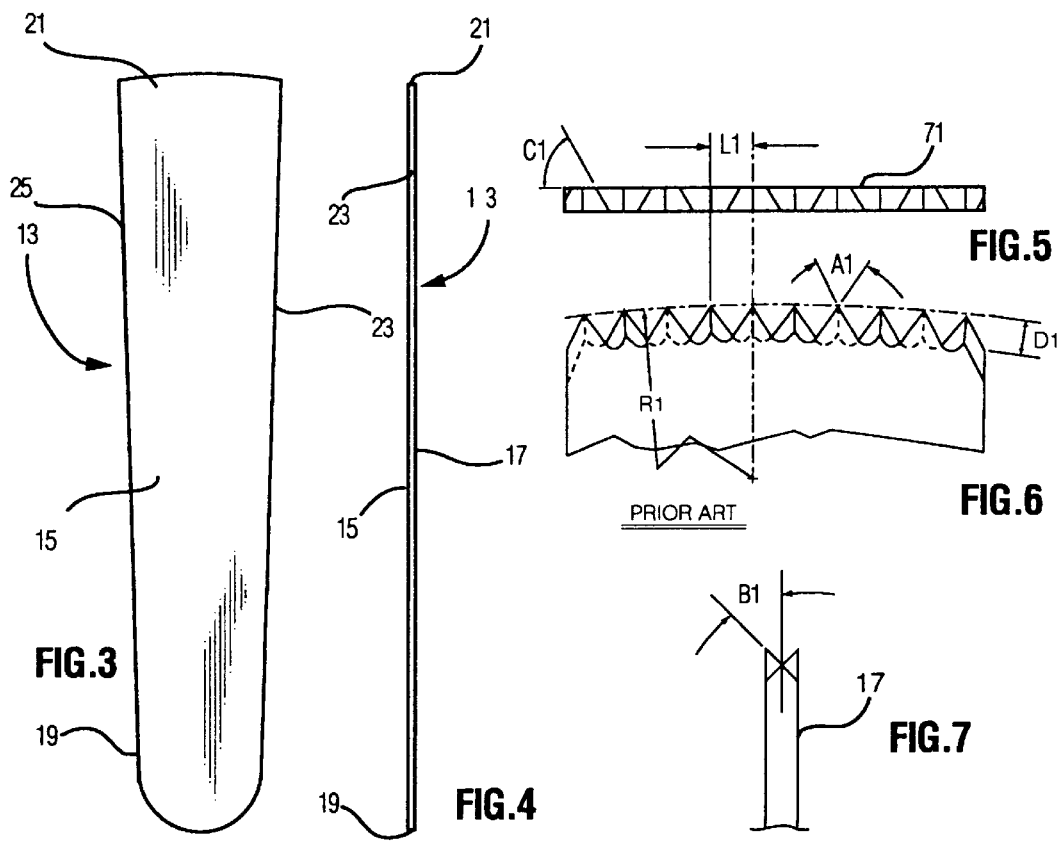

METHOD OF MANUFACTURE OF A BONE SAW BLADE BY WIRE CUTTING ELECTRIC DISCHARGE MACHINING

BACKGROUND OF THE INVENTION

1. Field of the Invention

This invention relates to general utility and specialized purpose blade manufacturing techniques and products produced thereby, and in particular, to a method of using wire electric discharge machining to machine the cutting portion of bone saw blades from metal blanks mounted in a jig.

2. Description of the Prior Art

Bone saw blades for use in oscillating cutting surgical instruments have traditionally been machined from metal by grinding, filing, and stamping processes. These processes limit the height and profile of the teeth of the resultant bone saw blades and can create unwanted burrs on the blades. As an example, a typical bone saw blade manufactured by a grinding process might have a tooth angle of 64 degrees, a tooth ridge angle of 90 degrees, a cutting surface angle of 60 degrees, a tooth depth of 0.073 inches, a distance between teeth of 0.0833 inches, and a radius of curvature of 3.5 inches. As will be apparent in the following description, the blades of the invention have teeth of greater height with an improved cutting profile.

Another method of machining metal is electric discharge machining (EDM). Most EDM processes operate under the same principles. A positively charged electrode and a negatively charged workpiece are separated by a dielectric medium or fluid. Direct current causes a spark discharge, or arc, between the workpiece and the electrode. The sparks remove material from the workpiece through melting or vaporization and the dielectric medium cools the workpiece and flushes away removed material.

There are basically two types of EDM, traditional EDM and wire EDM. Under traditional EDM, a flowing dielectric fluid in the spark gap provides a pathway for the spark and flushes away removed material. Traditional EDM is primarily used to produce die surfaces for small precision parts. Wire EMD works under the same principle but uses a wire electrode which cuts through the workpiece like a bandsaw when direct current passes through the wire electrode. Wire EDM, under numeric or computer control, can cut two dimensional openings to a precision of 0.0005 inches with roughnesses as low as 10 $\mu$m. Electrodes for traditional EDM are often made of copper, brass, aluminum, or steel. The materials for wire electrodes include copper, brass, zinc, boron, and composites containing steel. Wire EDM is also referred to as traveling wire EDM.

EDM processes have been known for many years and have been utilized in a variety of manufacturing processes. Despite the existence of EDM processes and their use in various industries, such techniques have not been utilized in the manufacture of bone saw blades with cross-cut style teeth, to the best of applicant's knowledge.

An object of the present invention is to provide an improved process by which cutting blades can be manufactured, particularly surgical cutting blades.

Another object of the invention is to provide an improved bone saw cutting blade which is sharper and easier to use, which cuts more efficiently, which generates less heat during manufacturing, which requires less deburring, and which reduces the chances of thermal necrosis while in use.

Another object of the invention is to provide an improved bone saw cutting blade which is relatively simple in design and economical to manufacture.

Another object of the invention is to provide a process for manufacturing surgical blades which allows the blade teeth to have increased height and depth and more pronounced profiles as compared to the prior art.

Another object of the invention is to utilize an EDM machining process to manufacture the cutting blades of the invention, which process is readily adapted to computer control to thereby facilitate frequent or necessary changes in the geometry of the blade teeth.

Another object of the invention is to provide cutting teeth with profiles that would be extremely difficult, if not impossible, to machine with conventional methods.

SUMMARY OF THE INVENTION

In the method of manufacturing bone saw blades of the invention, plural stacks of metal blanks having a generally flat, front surface, an opposite back surface, a heel end, an opposite top peripheral edge, a leading side edge, and a trailing side edge are loaded into a jig where they are offset from one another and secured in an angular position. The peripheral edges of the metal blanks are machined by multiple passes of a wire EDM process to produce teeth which are defined by a crest, a pair of opposite bases, a sharpened leading edge, an opposite sharpened trailing edge, a leading cutting surface, an opposite trailing cutting surface, and a tooth ridge. The cutting teeth on the bone saw blades manufactured by the method of the present invention are sharper, have better roughnesses, allow tooth profiles unobtainable with conventional machining methods, are virtually burr-free, and have cutting performances which reduce the chances of bone necrosis while in use.

Additional objects, features, and advantages will be apparent in the written description which follows.

BRIEF DESCRIPTION OF THE DRAWINGS

FIG. 2 is a front, plan view of the metal blanks being cut to form bone saw blades and the mounting jig of FIG. 1.

FIG. 3 is a front view of a metal blank of the present invention.

FIG. 4 is a side view of the metal blank of FIG. 3.

FIG. 5 is a top view of a prior art bone saw blade.

FIG. 6 is a front view of the teeth of the prior art bone saw blade of FIG. 5.

FIG. 7 is a side view of the teeth of the prior art bone saw blade of FIG. 5.

DETAILED DESCRIPTION OF THE INVENTION

Figure 1:
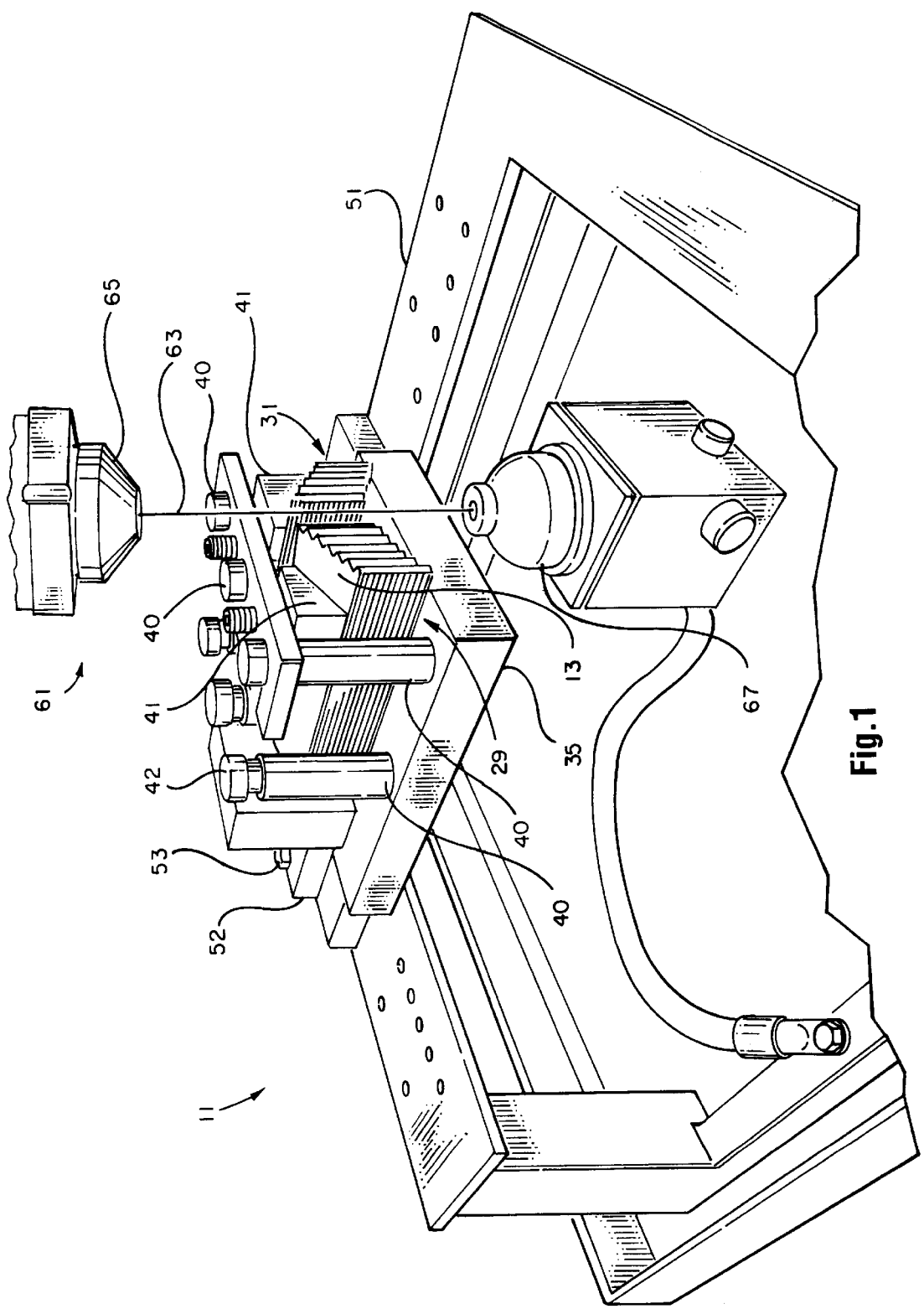
FIG. 1 is a perspective view of the mounting jig and table holding two stacks of metal blanks which are being machined by the wire EDM process, the table being partly broken away for ease of illustration.
Figure 8:
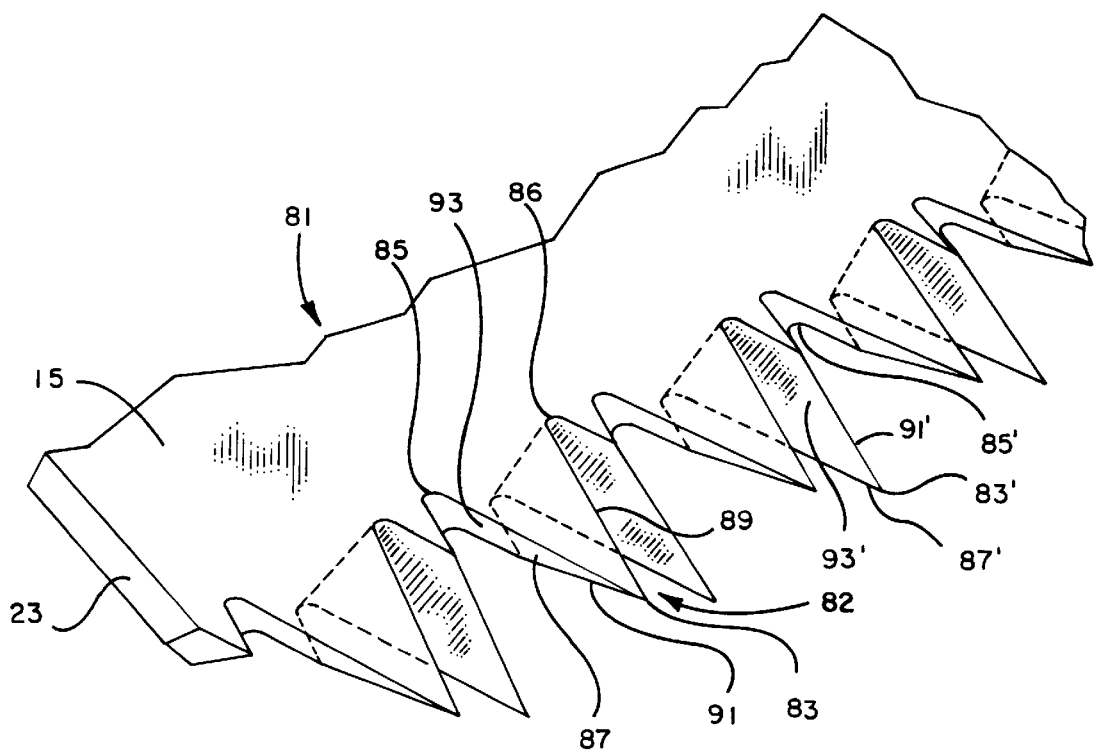
FIG. 8 is an enlarged perspective view of the teeth of the bone saw blade of the present invention with hidden portions of the teeth being illustrated in dotted lines.
Figure 9:
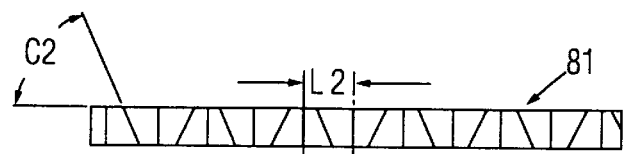
FIG. 9 is an enlarged top view of the bone saw blade of FIG. 8.
Figures 10, 11:
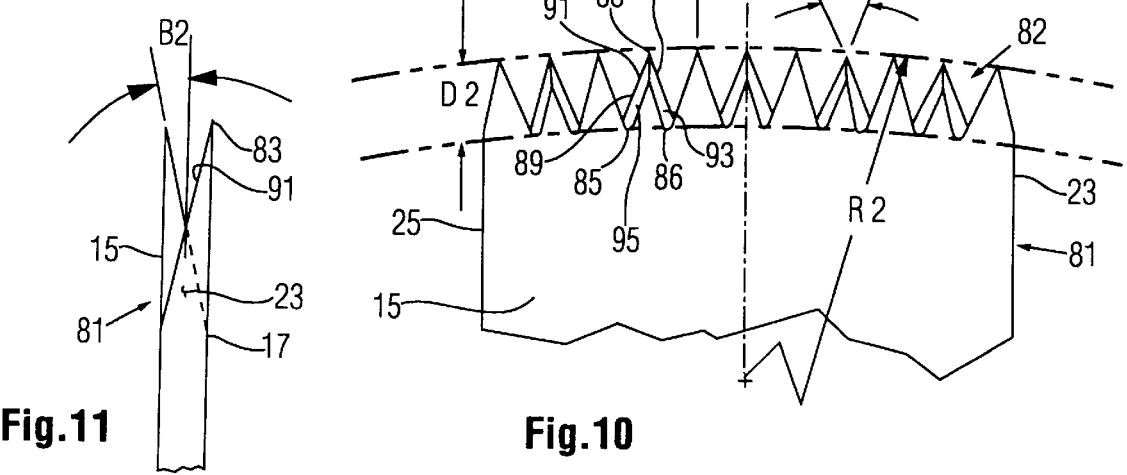
FIG. 10 is an enlarged front view of the teeth of the bone saw blade of FIG. 8.
FIG. 11 is an enlarged side view of the teeth of the bone saw blade of FIG. 8.

Referring to FIG. 1, FIG. 2, FIG. 3, and FIG. 4 in the drawings, numeral 11 illustrates the overall apparatus used in the preferred embodiment of the method of the present invention of manufacturing cutting teeth on bone saw blades from metal blanks 13. The metal blanks (13 in FIG. 3) have a generally flat, front surface 15, an opposite back surface 17, a heel end 19, an opposite top peripheral edge 21, a leading side edge 23, and an opposite trailing side edge 25. The exact dimensions of the metal blanks 13 used in the process will be determined by the exact end application for the blades and allow attachment to conventional oscillating drive means (not shown). A plurality of metal blanks 13 are stacked one atop another for use in the process such that the back surface 17 of each overlying metal blank 13 is in contact with the front surface 15 of each corresponding underlying metal blank 13 and the top peripheral edges 21 of the metal blanks 13 are aligned, thus forming a first stack 29. A second stack 31 is formed in the same manner.

In the process of the invention, the first stack 29 is loaded into a first cutting stage 33 (FIG. 2) of a jig 35 such that the leading side edge 23 (FIG. 3) of each overlying metal blank 13 is offset a selected distance towards the trailing side edge 25 of the corresponding underlying metal blank 13. In addition, the first stack 29 is loaded into the first cutting stage 33 of the jig 35 such that the trailing side edge 25 of each metal blank 13 is elevated a selected distance above the leading side edge 23. The loaded configuration can best be appreciated with respect to FIGS. 1 and 2. The second stack 31 is loaded into a second cutting stage 37 of the jig 35 such that the trailing side edge 25 of each overlying metal blank 13 is offset a selected distance towards the leading side edge 23 of the corresponding underlying metal blank 13. In addition, the second stack 31 is loaded into the second cutting stage 37 of the jig 35 such that the leading side edge 23 of each metal blank 13 is elevated a selected distance above the trailing side edge 25.

The first stack 29 and the second stack 31 are each supported in the jig 35 by a wedge 39 and vertical supports 40 which maintain a selected angle between the metal blanks 13 and the jig 35. The first stack 29 and the second stack 31 are releasably secured in the first cutting stage 33 and the second cutting stage 37, respectively, by clamping means 41, each having a sloping lower surface which forms the same angle with the jig 35 as its corresponding wedge 39. The first stack 29 and the second stack 31 are each further loaded and secured into the jig 35 such that the top peripheral edges 21 (FIGS. 3 and 4) of the metal blanks 13 are aligned and extend a selected distance beyond the confines of the jig 35. The top peripheral edges 21 of the metal blanks 13 are maintained in an aligned position due to the contact of each heel end 19 of each metal blank 13 with a jig stop 42 (FIG. 1).

It is understood that the metal blanks 13 may be loaded and clamped into the jig 35 with varying relative offsets and inclinations so as to machine cutting teeth in bone saw blades with tooth profiles different than those produced by the preferred embodiment of the method of the present invention.

The jig 35 is releasably mounted to a table 51 by brackets 52 and fasteners 53 (FIGS. 1 and 2). Brackets 55 attached to table 51 releasably receive conventional electrical or hydraulic actuators 57 which translate the jig 35 and the table 51 in a two-dimensional, generally horizontal plane by conventional electronic or hydraulic control systems (not shown). The metal blanks 13 are brought into close proximity with a conventional wire EDM tool 61 by either translating the jig 35 and table 51 toward the wire EDM tool 61 or by translating the wire EDM tool 61 toward the jig 35. The wire EDM tool 61 consists of a wire electrode 63 held in tension between a head portion 65 and a base portion 67. In the preferred embodiment, the jig 35 and the table 51 remain stationary during the machining process while the wire EDM tool 61 makes generally zigzag cutting passes relative to the metal blanks 13. The zigzag cutting passes are explained in more detail below. However, it is not critical whether the zigzag cutting passes are performed by holding the wire EDM tool 61 stationary and translating the jig 35 and table 51 in a zigzag fashion relative to the wire EDM tool 61, or vice versa.

A direct current is supplied from a conventional power source (not shown) and passed through the wire electrode 63. A conventional dielectric cooling fluid (not shown) is applied between the metal blanks 13 and the wire electrode 63 to cool the metal blanks 13 and the wire electrode 63. The dielectric cooling fluid also flushes away removed bits of the metal blanks 13. The wire EDM tool 61 is translated relative to the jig 35 and table 51 such that the top peripheral edges 21 of the metal blanks 13 forming the first stack 29 are brought into close proximity with the wire electrode 63 where they are subjected to the wire EDM process. A spark, or arc, (not shown) is produced by the current across the dielectric cooling fluid from the wire electrode 63 to the metal blanks 13. The arc melts or vaporizes the portion of the metal blanks 13 in close proximity to the wire electrode 63.

Referring now to FIG. 5, FIG. 6, and FIG. 7, a typical prior art bone saw blade 71, manufactured by conventional grinding techniques, is illustrated. In the case of the blade illustrated in FIGS. 5–7, the prior art grinding process produced a bone saw blade 71 with a tooth angle A1 of 64 degrees, a tooth ridge angle B1 of 45 degrees, a cutting surface angle C1 of 60 degrees, a tooth depth D1 of 0.073 inches, a distance between teeth L1 of 0.0833 inches, and a radius of curvature R1 of 3.5 inches. While these dimensions would vary somewhat from one application to the next, they are representative of the limitations inherent in the prior art techniques.

Referring now to FIG. 8, FIG. 9, FIG. 10, and FIG. 11, a typical bone saw blade 81 manufactured from a metal blank 13 by the method of the present invention is illustrated. The bone saw blade 81 is manufactured by subjecting the top peripheral edges 21 of the metal blanks 13 to the wire EDM process. The teeth 82 which are machined, are defined by a crest 83, a pair of opposite bases 85, 86, a sharpened leading cutting edge 87, a sharpened trailing cutting edge 89, a tooth ridge 91, a leading cutting surface 93, and a trailing cutting surface 95. The respective surfaces of a next adjacent tooth are illustrated with primes in FIG. 8. The leading cutting edge 87 is formed in either the front surface 15 or the back surface 17 by the intersection of the leading cutting surface 93 with either the front surface 15 or the back surface 17, respectively. The trailing cutting edge 89 is formed in either the front surface 15 or the back surface 17 by the intersection of the trailing cutting surface 95 with either the front surface 15 or the back surface 17, respectively. The crest 83 is formed in either the front surface 15 or the back surface 17 by the intersection of the leading cutting edge 87 and the trailing cutting edge 89. The tooth ridge 91 extends from the crest 83 of each tooth 82 to the back surface 17 for those teeth 82 in which the crest 83 lies in the front surface 15. The tooth ridge 91 extends from the crest 83 of each tooth 82 to the front surface 15 for those teeth 82 in which the crest 83 lies in the back surface 17.

It is understood that the bone saw blades manufactured by the method of the present invention are primarily for use in conventional oscillating drive means, and as such, cut bone during both the forward and reverse stroke; therefore, references to "leading" and "trailing" edges or surfaces are for ease of description with respect to the drawings and may vary depending upon the frame of reference during actual use.

The teeth 82 of the bone saw blade 81 are further defined by a tooth angle A2 (FIG. 10), formed by the intersection of the leading cutting edge 87 and the trailing cutting edge 89; a tooth ridge angle B2 which is the angle formed by the tooth ridge 91 and either the front surface 15 or the back surface 17; a tooth cutting surface angle C2 formed by the intersection of the leading cutting surfaces 93 and the trailing cutting surfaces 95 with the front surface 15 and the back surface 17; a tooth depth D2, as measured perpendicularly from the crest 83 to the bases 85; a distance between teeth L2, as measured along either the front surface 15 or the back surface 17; and a radius of curvature R2 (FIG. 10), as measured from the heel end 19 to the bases 85. For example, the bone saw blade 81 has a tooth angle A2 of sixty-four degrees or less, preferably at least thirty degrees; a tooth ridge angle B2 of forty-five degrees or less, preferably at least twenty-two degrees; a cutting surface angle C2 of about sixty degrees, a tooth depth D2 of 0.073 inches or more, preferably 0.130 inches, a distance between teeth L2 of about 0.094 inches, and a radius of curvature R2 of about 4.15 inches. It is understood that bone saw blades manufactured by the method of the present invention may have complex and irregular tooth profiles, and as such, may not have a constant radius of curvature R2. The other exemplary dimensions listed in the previously described embodiment of the invention will also vary depending upon the particular application or end use. However, teeth having increased height and depth and more pronounced profiles are achievable.

Figure 13:
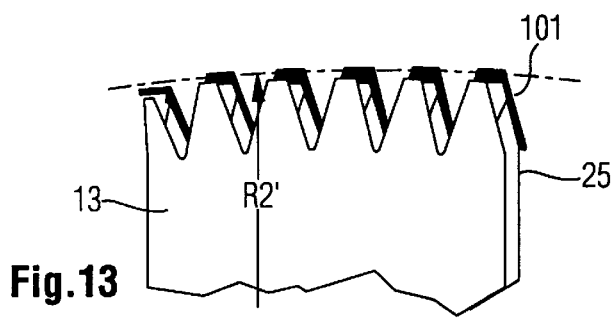
FIG. 13 is a schematic depicting a path of a first pass of the wire EDM process on a metal blank.
Figure 12:
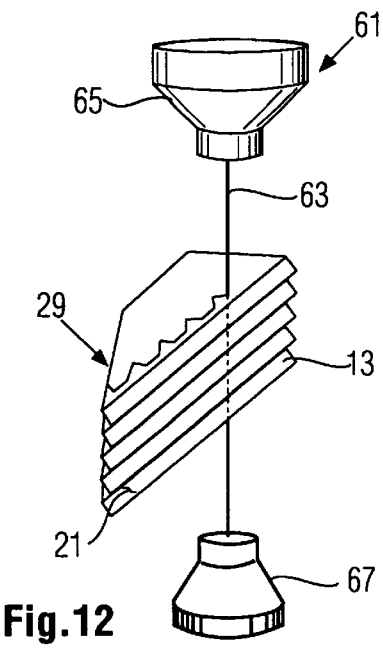
FIG. 12 is a perspective view of a portion of one stack of metal blanks being cut by the wire EDM process of the present invention.
Figure 14:
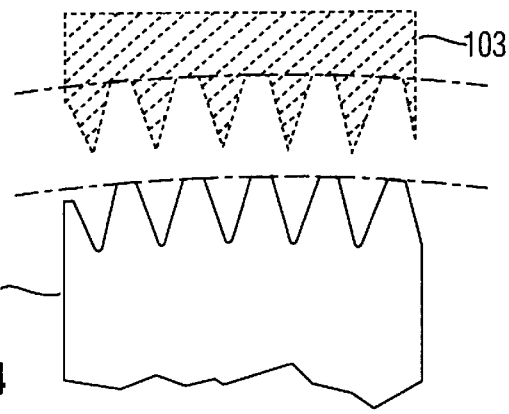
FIG. 14 is a schematic depicting a waste portion of the metal blank after the first pass of the wire EDM process.

Referring now to FIG. 12, FIG. 13, and FIG. 14, a first cutting pass 101 of the wire EDM tool 61 is illustrated. The first cutting pass 101 (see FIG. 13) is a staggered zigzag pattern, which generally follows an arc of radius R2', made from the leading side edge 23 of the metal blanks 13 to the trailing side edge 25 of the metal blanks 13, for both the first stack 29 in the first cutting stage 33 and the second stack 31 in the second cutting stage 37. As the wire EDM tool 61 or the jig 35 and the table 51 are translated, the wire EDM tool 61 and the wire electrode 63 cut through the first stack 29 and the second stack 31 like a bandsaw. The first cutting pass 101 removes a waste portion 103 (FIG. 14) from the metal blank 13. After the first cutting pass 101 is completed, the first stack 29 is removed from the first cutting stage 33 and the second stack is removed from the second cutting stage 37. The first stack 29 is then loaded into the second cutting stage 37 and the second stack 31 is loaded into the first cutting stage 33. The first stack 29 and the second stack 31 are releasably secured in the second cutting stage 33 and the first cutting stage 37, respectively, by clamping means 41. The top peripheral edges 21 of the metal blanks 13 are again maintained in an aligned position due to contact of each heel end 19 of each metal blank 13 with the jig stop 42.

Figure 15:
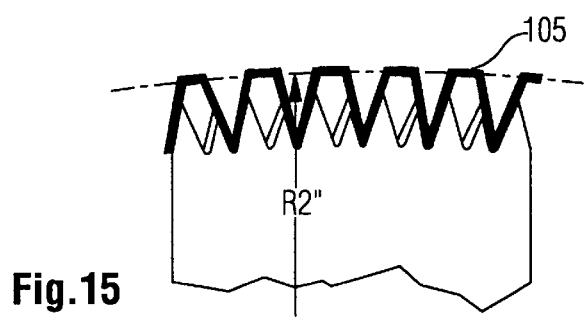
FIG. 15 is a schematic depicting a path of a second pass of the wire EDM process on the metal blank.
Figure 16:
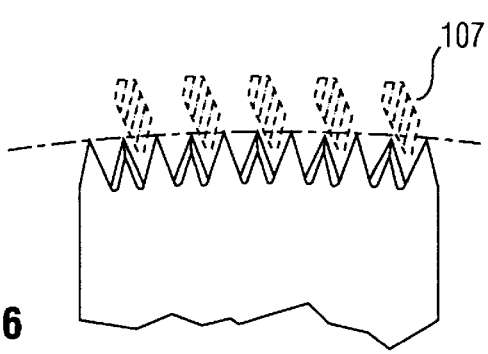
FIG. 16 is a schematic depicting waste portions of the metal blank after the second pass of the wire EDM.

Referring now to FIG. 15 and FIG. 16, a second cutting pass 105 (FIG. 15) of the wire EDM tool 61 is illustrated. The second cutting pass 105 is also a staggered zigzag pattern, which generally follows an arc of radius R2", made from the leading side edge 23 of the metal blanks 13 to the trailing side edge 25 of the metal blanks 13, for both the first stack 29 in the second cutting stage 37 and the second stack 31 in the first cutting stage 33. As the wire EDM tool 61 or the jig 35 and the table 51 are translated, the wire EDM tool 61 and the wire electrode 63 once again cut through the first stack 29 and the second stack 31 like a bandsaw. The second cutting pass 105 removes waste portions 107 (FIG. 16) from the metal blank 13. After the second cutting pass 105, the bone saw blades 81 are removed from the jig 35.

Figure 17:
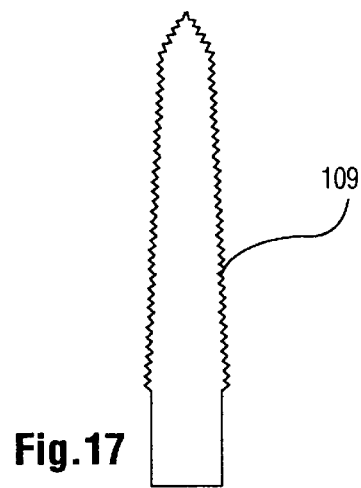
FIG. 17 is a plan view of a prior art bone saw blade with straight teeth as opposed to cross-cut style teeth.

Referring now to FIG. 17, a prior art bone saw blade 109 with conventional radially-extending straight teeth as opposed to conventional radially extending cross-cut teeth is illustrated.

Figure 18:
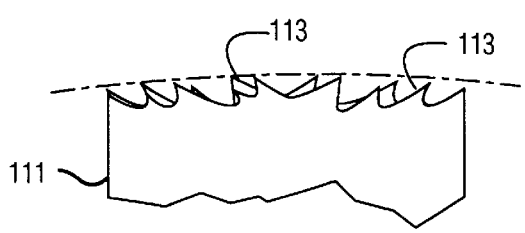
FIG. 18 is a plan view of a bone saw blade of the present invention with a complicated outwardly arching tooth profile.

Referring now to FIG. 18, a bone saw blade 111 of an alternate embodiment of the present invention is illustrated. Bone saw blade 111 has a complicated outwardly arching profile of teeth 113. Bone saw blade 111 is an example of how the wire EDM process of the present invention can be used to produce complicated tooth profiles that cannot be produced practically using other manufacturing techniques.

An invention has been provided with several advantages. The method of manufacturing cutting blades of the invention allows blades to be produced which are sharper, have better toughness and require less deburring. The cutting teeth can be made with increased height and improved cutting profiles as compared to the blades of the prior art. The method of the present invention allows for the manufacture of bone saw blades with smaller tooth angles A2 and smaller tooth ridge angles B2. Such bone saw blades cut more efficiently and generate less heat which reduces the chances for bone necrosis while in use. The cutting blades of the invention are particularly well suited for use in surgical instruments such as oscillating cutting instruments used as bone saws.

While the invention has been shown in only some of its forms, it should be apparent to those skilled in the art it is not so limited but is susceptible to various changes without departing from the scope of the invention.

What is claimed is:

1. A method of manufacturing a bone saw blade from a metal blank having a generally flat, front surface, an opposite back surface, a heel end, and an opposite top peripheral edge, a leading side edge, and an opposite trailing side edge, the method comprising the steps of:

loading at least one metal blank into a jig; and subjecting at least the top peripheral edge of the metal blank to a wire electric discharge machining process to machine a plurality of teeth therein;

wherein the teeth which are machined are machined such that the teeth are defined by a crest, a pair of opposite bases, a depth, as measured perpendicularly from the crest to the bases, a sharpened leading cutting edge, an opposite sharpened trailing cutting edge, a leading cutting surface, a trailing cutting surface, and a tooth ridge which extends:

from the crest of each tooth to the back surface for each tooth where the crest lies in the front surface; and from the crest of each tooth to the front surface for each tooth where the crest lies in the back surface.

2. The method of claim 1, wherein the teeth which are machined are further machined so as to produce tooth ridge angles of about twenty-two degrees or less.

3. The method of claim 1, wherein the teeth which are machined are further machined so as to produce tooth angles of about thirty degrees or less.

4. The method of claim 1, wherein the teeth which are machined are further machined such that the depth of each tooth is at least about one hundred and thirty thousandths of an inch.

5. A method of manufacturing a bone saw blade from a metal blank having a generally flat, front surface, an opposite back surface, a heel end, an opposite top peripheral edge, a leading side edge, and an opposite trailing side edge, the method comprising the steps of:

loading a plurality of the metal blanks one atop another to form a stack in a jig such that the back surface of an overlying metal blank is in contact with the front surface of a corresponding underlying metal blank; and subjecting at least the top peripheral edges of the stack to a wire electric discharge machining process to machine a plurality of teeth therein;

wherein the stack which is loaded into the jig is loaded such that each overlying metal blank is transversely offset a selected distance with respect to the corresponding underlying metal blank.

6. A method of manufacturing a bone saw blade from a metal blank having a generally flat, front surface, an opposite back surface, a heel end, an opposite top peripheral edge, a leading side edge, and an opposite trailing side edge, the method comprising the steps of:

loading a plurality of the metal blanks one atop another to form a stack in a jig such that the back surface of an overlying metal blank is in contact with the front surface of a corresponding underlying metal blank; and subjecting at least the top peripheral edges of the stack to a wire electric discharge machining process to machine a plurality of teeth therein;

wherein the stack which is loaded into the jig is loaded such that the stack is loaded into a cutting stage of the jig such that the leading side edge of each metal blank is elevated a selected distance above the trailing side edge of each metal blank relative to the jig.

7. A method of manufacturing a bone saw blade from a metal blank having a generally flat, front surface, an opposite back surface, a heel end, an opposite top peripheral edge, a leading side edge, and an opposite trailing side edge, the method comprising the steps of:

loading a plurality of the metal blanks one atop another to form a stack in a jig such that the back surface of an overlying metal blank is in contact with the front surface of a corresponding underlying metal blank; and subjecting at least the top peripheral edges of the stack to a wire electric discharge machining process to machine a plurality of teeth therein;

wherein the teeth which are machined are machined such that the teeth are defined by a crest, a pair of opposite bases, a depth, as measured perpendicularly from the crest to the bases, a sharpened leading cutting edge, an opposite sharpened trailing cutting edge, a leading cutting surface, a trailing cutting surface, and a tooth ridge which extends:

from the crest of each tooth to the back surface for each tooth where the crest lies in the front surface; and from the crest of each tooth to the front surface for each tooth where the crest lies in the back surface.

8. A method of manufacturing a bone saw blade from a metal blank having a generally flat, front surface, an opposite back surface, a heel end, an opposite top peripheral edge, a leading side edge, and an opposite trailing side edge, the method comprising the steps of:

loading a plurality of the metal blanks one atop another to form a stack in a jig such that the back surface of an overlying metal blank is in contact with the front surface of a corresponding underlying metal blank; and subjecting at least the top peripheral edges of the stack to a wire electric discharge machining process to machine a plurality of teeth therein;

wherein the teeth which are machined such that the crest lies in the front surface of the metal blank are offset a selected distance from the adjacent teeth machined such that the crest lies in the back surface of the metal blank.

9. The method of claim 8, wherein the teeth which are machined are further machined so as to produce tooth ridge angles of about forty-five degrees or less.

10. The method of claim 8, wherein the teeth which are machined are further machined so as to produce tooth angles of about sixty-four degrees or less.

11. The method of claim 8, wherein the teeth which are machined are further machined such that the depth of each tooth is at least about seventy-three thousandths of an inch.

12. A method of manufacturing a bone saw blade from a metal blank having a generally flat, front surface, an opposite back surface, a heel end, an opposite top peripheral edge, a leading side edge, and an opposite trailing side edge, the method comprising the steps of:

loading a plurality of the metal blanks one atop another to form a first stack in a jig such that the back surface of an overlying metal blank is in contact with the front surface of a corresponding underlying metal blank;

loading the first stack into a first cutting stage of the jig such that the top peripheral edges of the metal blanks are aligned and extend at least beyond the confines of the jig;

loading the first stack into the first cutting stage of the jig such that each overlying metal blank is transversely offset a selected distance with respect to the corresponding underlying metal blank;

loading the first stack into the first cutting stage of the jig such that the trailing side edge of each metal blank is elevated a selected distance above the corresponding leading side edge of each metal blank relative to the jig;

loading a second stack into a second cutting stage of the jig such that the top peripheral edges of the metal blanks are aligned and extend at least beyond the confines of the jig;

loading the second stack into the second cutting stage of the jig such that each overlying metal blank is transversely offset a selected distance with respect to the corresponding underlying metal blank;

loading the second stack into the second cutting stage of the jig such that the leading side edge of each metal blank is elevated a selected distance above the corresponding trailing side edge of each metal blank relative to the jig;

subjecting the top peripheral edges of the first stack and the second stack to a wire electric discharge machining process to machine a plurality of teeth therein;

unloading the first stack and the second stack from the jig;

loading the first stack into the second cutting stage and the second stack into the first cutting stage; and again subjecting the top peripheral edges of the first stack and the second stack to a wire electric discharge machining process to machine a plurality of teeth therein, the teeth being machined such that the teeth are defined by a crest, a pair of opposite bases, a depth, as measured perpendicularly from the crest to the bases, a sharpened leading cutting edge, an opposite sharpened trailing cutting edge, a leading cutting surface, a trailing cutting surface, and a tooth ridge which extends:

from the crest of each tooth to the back surface for each tooth where the crest lies in the front surface; and from the crest of each tooth to the front surface for each tooth where the crest lies in the back surface.

13. The method of claim 12, wherein the teeth which are machined such that the crest lies in the front surface of the metal blank are offset a selected distance from the adjacent teeth machined such that the crest lies in the back surface of the metal blank.

14. The method of claim 12, wherein the teeth which are machined are further machined so as to produce tooth ridge angles of about forty-five degrees or less.

15. The method of claim 12, wherein the teeth which are machined are further machined so as to produce tooth angles of about sixty-four degrees or less.

16. The method of claim 12, wherein the teeth which are machined are further machined such that the depth of each tooth is at least about seventy-three thousandths of an inch.

* * * * *